(12) United States Patent
Meshal et al.

(10) Patent No.: US 12,716,541 B2
(45) Date of Patent: Aug. 25, 2026

(54) METHOD AND APPARATUS FOR TEMPORARY SEALING OF FLANGE LEAKS ON INDUSTRIAL PIPELINES

(71) Applicant: Saudi Arabian Oil Company, Dhahran (SA)

(72) Inventors: Fahad M. Meshal, Khobar (SA); Abiola Onikoyi, Khurais (SA); Mohammad A. Al-Otaibi, Khobar (SA); Khaled Al-Sunnary, Dammam (SA)

(73) Assignee: Saudi Arabian Oil Company, Dhahran (SA)

(*) Notice: Subject to any disclaimer, the term of this patent is extended or adjusted under 35 U.S.C. 154(b) by 402 days.

(21) Appl. No.: 18/419,356

(22) Filed: Jan. 22, 2024

(65) Prior Publication Data

US 2025/0237340 A1 Jul. 24, 2025

(51) Int. Cl.
*F16L 55/175* (2006.01)
*F16L 23/02* (2006.01)

(52) U.S. Cl.
CPC ............. *F16L 55/175* (2013.01); *F16L 23/02* (2013.01)

(58) Field of Classification Search
CPC ......... F16L 55/175; F16L 55/18; F16L 55/16; F16L 55/168; F16L 23/16; F16L 23/165
See application file for complete search history.

(56) References Cited

U.S. PATENT DOCUMENTS 317,408 A * 5/1885 Moeser ................. F16L 23/165 285/341
4,073,836 A * 2/1978 Harrison ............... F16L 55/175 264/231
6,217,688 B1 * 4/2001 Landers .................. F16L 55/18 264/36.16
2002/0021004 A1 * 2/2002 Mitchell ................. F16L 55/18 285/15
2012/0090719 A1 * 4/2012 Wang .................... F16L 55/175 138/97

FOREIGN PATENT DOCUMENTS

CN 204459547 U 7/2015
KR 200469247 Y1 9/2013

* cited by examiner

*Primary Examiner* — David R Deal
(74) *Attorney, Agent, or Firm* — Dinsmore & Shohl LLP

(57) ABSTRACT

The present disclosure is directed to methods and systems for temporarily sealing a leak between flanges of a pipeline. The disclosed systems comprise a flexible tube, a sealant fluid, and a gas-release assembly. The flexible tube comprises a tube material impermeable to the sealant fluid, and the sealant fluid comprises viscoelastic properties that allow it to be pressurized to create a seal and stop or reduce the leak. The disclosed methods comprise pressurizing the sealant fluid in the flexible tube, concurrently removing a gas trapped inside the system using the gas-release assembly, and expanding the flexible tube comprising the pressurized sealant fluid to fill the flange gap between the flanges, and thereby stop or reduce the leak between the flanges.

16 Claims, 3 Drawing Sheets

104
120
240
220
140
102
122
160
142
132
130
220
240

METHOD AND APPARATUS FOR TEMPORARY SEALING OF FLANGE LEAKS ON INDUSTRIAL PIPELINES

FIELD

The present disclosure relates to methods of and apparatuses for temporary sealing of flange leaks on industrial pipelines.

BACKGROUND

Flange leaks in industrial pipelines pose serious threats to operations, safety, and the environment. Conventional approaches for flange leak repairs often require shutting down the pipeline system, which is time consuming and may not be immediately feasible. Further, shutting down a pipeline system could cause considerable economic loss. Therefore, there is a need for methods and apparatuses that are capable of temporarily sealing the leaks before shutting down the pipeline system.

SUMMARY

The risk of leakage from flanges or joints between flanges can be kept under control by a temporary sealing system before permanent repair or replacement can be feasibly carried out. Embodiments of the present disclosure meet this need by providing a system for temporarily sealing leaks between flanges of a pipeline. A system may comprise a flexible tube that holds a sealant fluid pressurizable up to 220 bar. A method includes looping the flexible tube around the flange joint and subsequently pressurizing the sealant fluid within the flexible tube. The system thereby creates a tight, pressure-resistant seal between the flanges and stops the leak. Further, the sealant fluid remains fluidic under a pressure up to 220 bar, and the flexible tube is made of a tube material impermeable to the sealant fluid such that the sealant fluid may be retained within the flexible tube during an operation, may be depressurized and removed from the flexible tube after the operation, and may be reused for additional leaks.

Embodiments of the present disclosure are directed to methods of temporarily sealing a leak between flanges of a pipeline wherein the flanges are spaced apart by a flange gap and interconnected by a plurality of bolts. The method includes providing a system for temporarily sealing leaks between flanges of a pipeline, the system comprising a flexible tube, a sealant fluid, a fluid pump, and a gas-release assembly. The flexible tube comprises a tube material impermeable to the sealant fluid such that an outer surface of the flexible tube is essentially free of the sealant fluid. The sealant fluid comprises a viscosity of from 100 cps to 50,000 cps, and a volume elasticity range of from 0.1 MPa to 10 MPa under a pressure ranging from 1 bar to 220 bar and at a temperature ranging from −40° C. to 150° C. The method further includes disposing the flexible tube between the flanges such that the flexible tube substantially fills the flange gap between the flanges; introducing the sealant fluid into the flexible tube using the fluid pump; and pressurizing the sealant fluid using the fluid pump to an operating pressure of from greater than or equal to 5 bar to less than or equal to 220 bar and concurrently removing a gas trapped inside the sealant fluid and the flexible tube using the gas-release assembly. The pressurized sealant fluid expands the flexible tube to fill the flange gap between the flanges, and thereby stops or reduces the leak between the flanges.

Additional features and advantages will be set forth in the detailed description that follows, and in part will be readily apparent to those skilled in the art from that description or recognized by practicing the embodiments described herein, including the detailed description that follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Reference will now be made in detail to embodiments of methods of temporarily sealing a leak between flanges of a flange assembly of a pipeline wherein the flanges are spaced apart and interconnected by a plurality of bolts.

Figure 1:
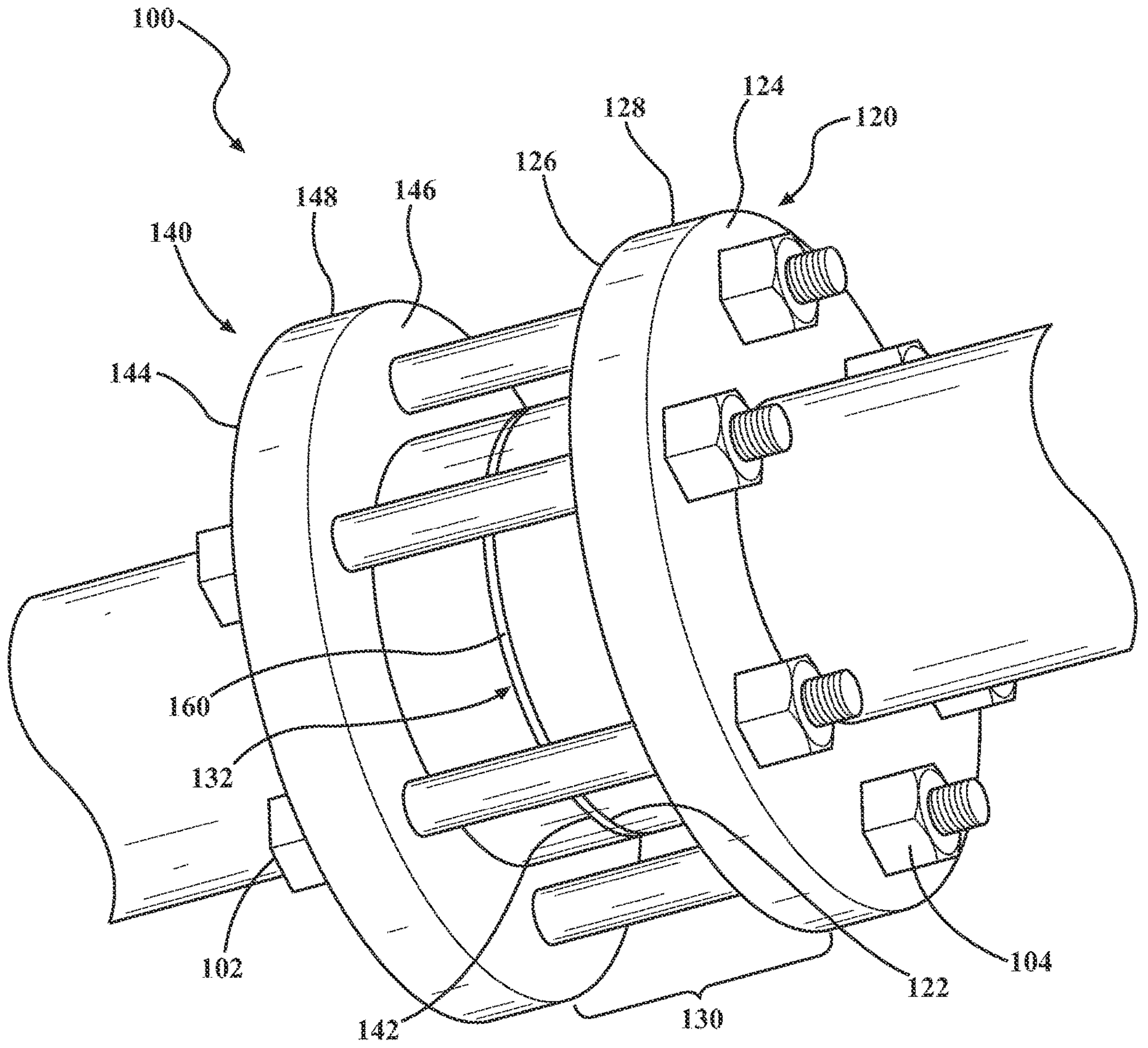
FIG. 1 is a perspective view of a flange assembly which may be repaired in accordance with an embodiment of the present invention.
Figures 3, 4:
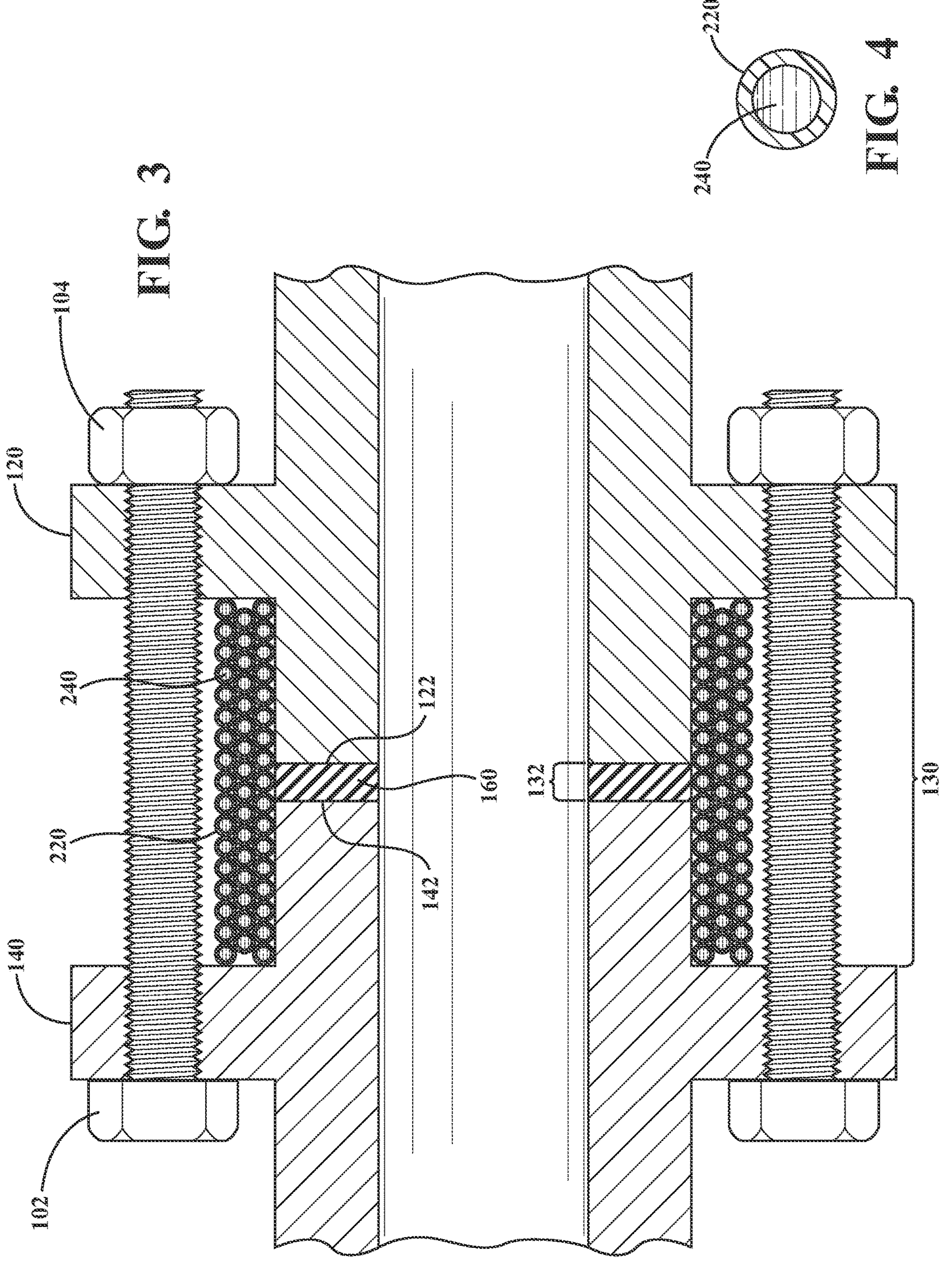
FIG. 3 is a cross-sectional view of the system and flange assembly of FIG. 2.
FIG. 4 is a cross-sectional view of a flexible tube filled with and expanded by a sealant fluid.

Referring initially to FIG. 1, a flange assembly 100 of a pipeline may comprise a first flange 120 and a second flange 140 positioned on the opposite sides of a gasket 160. The flanges 120 and 140 are spaced apart by a flange gap 130 and interconnected by a plurality of bolts 102 and nuts 104. Referring to FIG. 1 and FIG. 3, the first flange 120 and the second flange 140 each individually comprises a sealing face (122 and 142), an inner flange surface (126 and 146), an outer flange surface (124 and 144), and a circumference (128 and 148). Typically, the sealing face 122 of the first flange 120 and the sealing face 142 of the flange 140 may face the opposite sides of the gasket 160. When the first flange 120 and the second flange 140 are interconnected and the plurality of bolts 102 and nuts 104 are tightened, the sealing faces of the first flange 120 and the second flange 140 press against the opposite sides of the gasket 160 forming a flange joint 132 and creating a seal for a secured transportation of gaseous or fluidic substance in the pipeline. The flange joint 132 may extend for a distance between the sealing faces of the first flange 120 and the second flange 140 that is less than or equal to the flange gap 130.

It is noted that flanges come with various types and design. The scope of the present disclosure should not be limited to a flange assembly and a flange joint illustrated in FIG. 1. For example, not all flange joints may include a gasket, but may be sealed by other means including metal-to-metal joints or tongue-and-groove joints.

According to embodiments, methods disclosed herein may comprise providing a system for temporarily sealing leaks between flanges of a pipeline comprising a flexible tube, a sealant fluid, a fluid pump, and a gas-release assembly, wherein the flexible tube may comprise a tube material impermeable to the sealant fluid such that an outer surface of the flexible tube is essentially free of the sealant fluid; and the sealant fluid may comprise a viscosity of from 100 cps to 50,000 cps and a volume elasticity range of from 0.1 MPa to 10 MPa under a pressure of from 1 bar to 220 bar and at a temperature of from −40° C. to 150° C.; disposing the flexible tube between the flanges such that the flexible tube substantially fills the flange gap between the flanges; introducing the sealant fluid into the flexible tube using the fluid pump; and pressurizing the sealant fluid using the fluid pump to an operating pressure from greater than or equal to 5 bar to less than or equal to 220 bar and concurrently removing a gas trapped inside the sealant fluid and the flexible tube using the gas-release assembly, wherein the pressurized sealant fluid expands the flexible tube to fill the flange gap between the flanges and thereby stops or reduces the leak between the flanges.

As used herein, "a leak between flanges" or "leaks between flanges" refers to a leakage from a point between two interconnected flanges. For example, a point within the flange gap 130, a point near the flange joint 132, or a point near the gasket 160.

As used herein, the flexible tube refers to any of variously cylindrically structures or devices. The tube may have various cross-sectional shapes. For example, the tube cross section may be a rectangular, a square, an oval, a circle, a polygon, or combinations thereof.

As used herein, "impermeable" means that the sealant fluid does not pass through an inner surface, an outer surface, and/or a material between the inner surface and the outer surface of the flexible tube and appear on the outer surface of the flexible tube by processes such as penetration, diffusion, or sorption such that the outer surface of the flexible tube is essential free of the sealant fluid. As used herein, an outer surface of the flexible tube is "essential free of the sealant fluid" means that an outer surface material of the flexible tube comprises less than 0.01 wt. % of the sealant fluid contained within the system.

Now, reference to FIG. 3, as used herein, "disposing the flexible tube between the flanges" means introducing the flexible tube 220 within the flange gap 130 between the two interconnected flange plates and wrapping the flexible tube 220 around the flange joint 132. As used herein, "wrapping the flexible tube around the flange joint" means arranging, looping, coiling or winding the flexible tube 220 in a joined sequence of concentric circles or rings to encircle the flange joint 132 and to substantially fill the flange gap 130 between flanges 120 and 140 in a manner such that, upon being expanded by the pressurized sealant fluid 240 as shown in FIG. 4, the flexible tube 220 fills the flange gap 130, creates an air-tight seal, and thereby stops or reduces the leak between the flanges. For example, as shown in FIG. 3, the flexible tube 220 may encircle the flange joint 132 and fill the flange gap 130 in a multi-layer, staggered manner to create the air-tight seal needed for stopping or reducing the leak between the flanges.

As used herein, "concurrently removing a gas trapped inside the sealant fluid" means that the gas is being removed from the sealant fluid inside the flexible tube starting from introducing the sealant fluid into the flexible tube and during pressurizing the sealant fluid until the pressurized sealant fluid expands the flexible tube to fill the flange gap between the flanges and stops or reduces the leak between the flanges. In embodiments, the gas may continuously be removed from the sealant fluid even after the leak has been stopped or reduced in order to maintain the seal.

It is noted that it is preferable to entirely stop a leak using a system and method of the present invention. However, reducing a leak may be beneficial and reducing a leak falls within the scope of the present invention.

In one or more embodiments, methods disclosed herein may further comprise removing the sealant fluid from the flexible tube and deflating the flexible tube, wherein the flexible tube and the sealant fluid may be reusable for additional leaks between flanges of a pipeline.

Reference will now be made in detail to embodiments of systems for temporarily sealing leaks between flanges of a pipeline.

Figure 2:
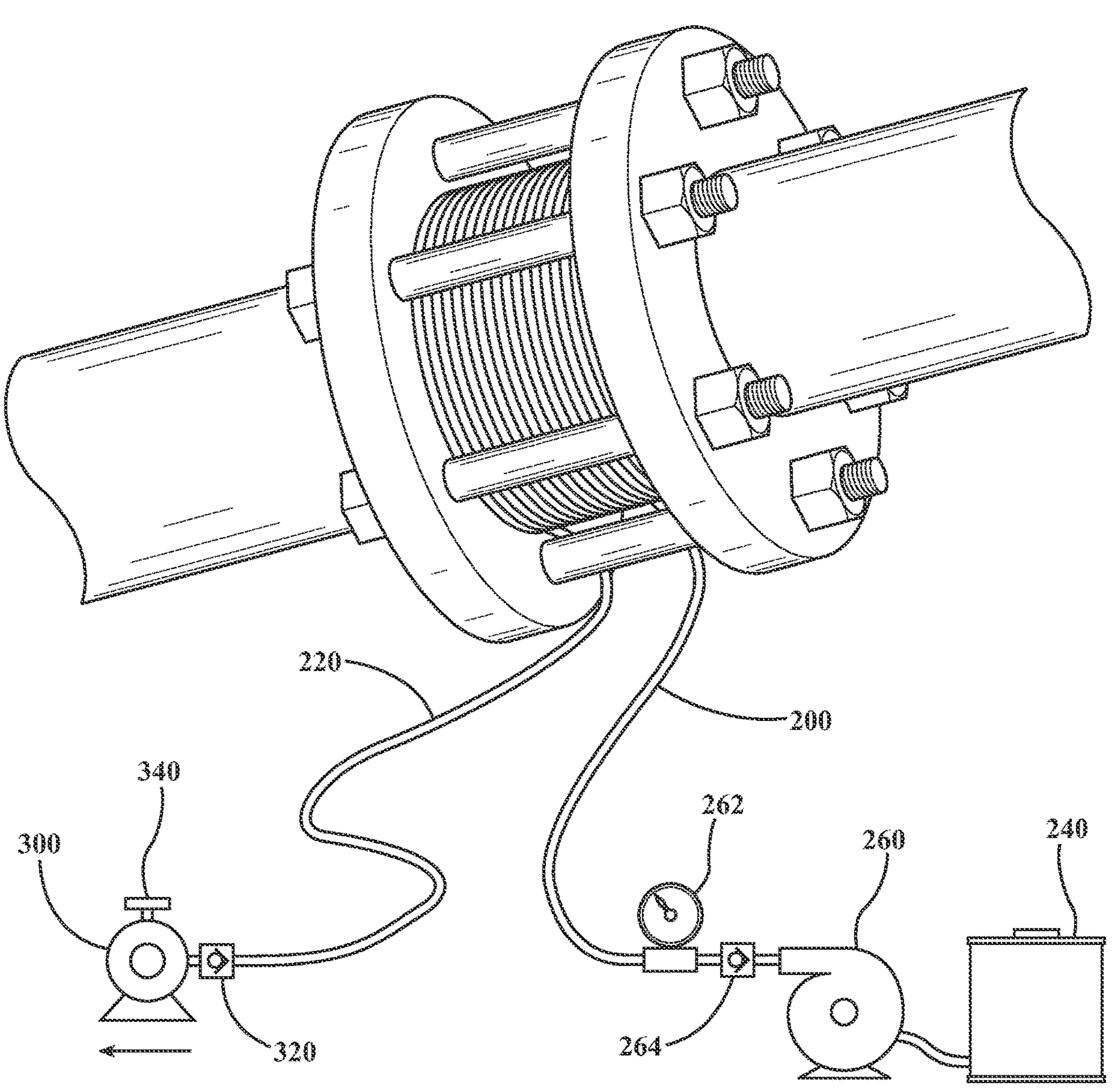
FIG. 2 is a perspective view similar to FIG. 1 showing a system for temporarily sealing leaks between flanges in accordance with an embodiment of the present invention.

Referring now to FIG. 2, a system 200 for temporarily sealing leaks between flanges of a pipeline may comprise a flexible tube 220, a sealant fluid 240, a fluid pump 260, and a gas release assembly 300. The flexible tube 220 may have one end connected to a fluid outlet of the fluid pump 260, and an opposite end connected to a gas release assembly 300 through a gas inlet of the gas release assembly 300. When deploying the system 200 to seal a flange leak, the flexible tube 220 may be first disposed between the flanges 120 and 140 and wrapped between the flanges 120 and 140 such that the flexible tube 220 encircles the flange joint 132 and substantially fills the flange gap 130 between the flanges 120 and 140. Subsequently, the fluid pump 260 may pressurize and pump the sealant fluid 240 into the flexible tube 220, and inflate the flexible tube 220 creating a tight seal around the flange joint 132 that stops or reduces the flange leak. The gas-release assembly 300 may remove a gas trapped in the sealant fluid 240 concurrently when the fluid pump 260 pressurizes and pumps the sealant fluid 240 to inflate the flexible tube 220.

Regarding the fluid pump 260, the fluid pump 260 may comprise a fluid inlet connected to a source, a reservoir, or a vessel containing the sealant fluid 240. The fluid pump 260 may further comprise a pressure gauge 262 measuring an operating pressure of the sealant fluid 240 at the fluid outlet of the fluid pump 260 when the fluid pump 260 pressurizes and pumps the sealant fluid 240 into the flexible tube 220.

According to embodiments, the fluid pump 260 may pressurize the sealant fluid 240 to an operating pressure of from greater than or equal to 5 bar to less than or equal to 220 bar, such as from greater than or equal to 5 bar to less than or equal to 175 bar, from greater than or equal to 5 bar to less than or equal to 150 bar, from greater than or equal to 5 bar to less than or equal to 125 bar, from greater than or equal to 5 bar to less than or equal to 75 bar, from greater than or equal to 5 bar to less than or equal to 25 bar, from greater than or equal to 5 bar to less than or equal to 10 bar, from greater than or equal to 10 bar to less than or equal to 175 bar, from greater than or equal to 10 bar to less than or equal to 100 bar, from greater than or equal to 10 bar to less than or equal to 50 bar, from greater than or equal to 50 bar to less than or equal to 125 bar, from greater than or equal to 50 bar to less than or equal to 75 bar, from greater than or equal to 100 bar to less than or equal to 220 bar, from greater than or equal to 100 bar to less than or equal to 150 bar, or from greater than or equal to 150 bar to less than or equal to 220 bar.

The fluid pump 260 may further comprise a first check valve 264 that prevents, blocks, stops, or hinders the sealant fluid 240 in the flexible tube 220 from flowing back to the pump and into the source, the reservoir, or the vessel containing the sealant fluid 240.

As used herein, "check valve," refers a valve that normally allows fluid (liquid or gas) to enter the valve from an inlet opening, flow through the valve in only one direction towards an outlet opening, and exit the valve through the outlet opening. A check valve may include a one-way valve, non-return valve, reflux valve, retention valve, or foot valve.

Regarding the gas release assembly 300, the gas release assembly 300 may comprise a second check valve 320. According to embodiments, the second check valve 320 may be configured to pass a gas trapped in the sealant fluid 240, the sealant fluid 240, or combinations thereof inside the flexible tube 220 through the second check valve 320 and leave the system 200. However, once the gas and the sealant fluid 240 leaves the system 200 through the second check valve 320, the second check valve 320 may be configured to prevent, hinder, block, or stop the gas, the sealant fluid 240, or combinations thereof from passing through the second check valve 320 and returning or entering the system 200.

In one or more embodiments, the second check valve 320 may be configured to pass only the gas trapped in the sealant fluid 240 or inside the flexible tube 220 through the second check valve 320 and leave the system 200, when the sealant fluid is pressurized to a pressure less than or equal to the operating pressure.

In further embodiments, the second check valve 320 may be configured to pass only the gas trapped in the sealant fluid 240 or inside the flexible tube 220 through the second check valve 320 and leave the system 200, when the sealant fluid is pressurized to a pressure less than the operating pressure, but to begin passing the sealant fluid 240 through the second check valve 320 and leave the system 200, when the sealant fluid 240 is pressurized to an operating pressure of greater than or equal to the operating pressure, such as greater than or equal to 5 bar, greater than or equal to 10 bar, greater than or equal to 50 bar, greater than or equal to 100 bar, greater than or equal to 125 bar, greater than or equal to 150 bar, greater than or equal to 200 bar, or greater than or equal to 220 bar.

In one or more embodiments, the gas release assembly 300 may further comprise a window 340. The window 340 provides an unobstructed view into a portion of the gas release assembly 300. When the sealant fluid appears to be observable through the window 340, it indicates that the sealant fluid 240 has filled the flexible tube 220 and has been pressurized to a target pressure.

Reference will now be made in details to embodiments of flexible tubes.

According to embodiments, the flexible tube may comprise a tube material impermeable to a sealant fluid such that an outer surface of the flexible tube is essentially free of the sealant fluid. In one or more embodiments, the tube material is selected from one or more of nitrile rubber, ethylene propylene diene monomer rubber, neoprene rubber, and combinations thereof.

For example, the flexible tube 220 may comprise an inner surface material impermeable to the sealant fluid 240, an outer surface material impermeable to the sealant fluid, a tube material between the inner surface material and the outer surface material impermeable to the sealant fluid 240, or combinations thereof. The inner surface material, the outer surface material, and the tube material may be independently selected from one or more of nitrile rubber, ethylene propylene diene monomer rubber, neoprene rubber, and combinations thereof.

According to embodiments, the flexible tube may have a starting diameter or width of from 2 mm to 4 mm before introducing the sealant fluid into the flexible tube and an expanded diameter or width of from 2 mm to 8 mm after the sealant fluid has been introduced into the flexible tube and pressurized.

Reference will now be made in details to embodiments of sealant fluids.

Sealant fluids are selected based on their viscoelastic properties such that they are substantially incompressible under a high operating pressure up to 220 bar and remain capable of inflating the flexible tube 220 to create a tight seal around the flange joints. Without being bound by any particular theory, viscoelastic properties of a material may be pressure- and/or temperature-dependent and may variously depend on the operating pressure and operating temperature.

According to embodiments, the sealant fluids may comprise a viscosity of from 100 cps to 50,000 cps and a volume elasticity range of from 0.1 MPa to 10 MPa under a pressure ranging from 1 bar to 220 bar and at a temperature ranging from −40° C. to 150° C.

For example, under a pressure ranging from 1 bar to 220 bar and at a temperature ranging from −40° C. to 150° C., the sealant fluid may comprise a viscosity of from 100 cps to 40,000 cps, from 500 cps to 50,000 cps, from 500 cps, to 30,000 cps, from 500 cps to 10,000 cps, from 500 cps, to 5,000 cps, from 1,500 cps to 50,000 cps, from 1,500 cps to 45,000 cps, from 1,500 cps to 25,000 cps, from 1,500 cps to 7,500 cps, from 5,000 cps to 50,000 cps, from 5,000 cps to 40,000 cps, from 5,000 cps to 25,000 cps, from 5,000 cps to 15,000 cps, from 10,000 cps to 50,000 cps, from 10,000 cps to 30,000 cps, from 25,000 cps to 50,000 cps, or from 25,000 cps to 40,000 cps.

For another example, under a pressure ranging from 1 bar to 220 bar and at a temperature ranging from −40° C. to 150° C., the sealant fluid may comprise a volume elasticity of from 0.1 MPa to 10 MPa, such as from 0.1 MPa to 5 MPa, from 0.1 MPa to 1 MPa, from 1 MPa to 10 MPa, from 1 MPa to 5 MPa, from 5 MPa to 10 MPa, from 5 MPa to 7.5 MPa, or from 7.5 MPa to 10 MPa.

In one or more embodiments, the sealant fluids may comprise a viscosity of from 100 cps to 40,000 cps and a volume elasticity range of from 0.1 MPa to 10 MPa under a pressure ranging from 50 bar to 220 bar and at a temperature ranging from −20° C. to 100° C.

For example, under a pressure ranging from 50 bar to 220 bar and at a temperature ranging from −20° C. to 100° C., the sealant fluid may comprise a viscosity of from 100 cps to 40,000 cps, from 500 cps, to 30,000 cps, from 500 cps to 10,000 cps, from 500 cps, to 5,000 cps, from 1,500 cps to 40,000 cps, from 1,500 cps to 25,000 cps, from 1,500 cps to 7,500 cps, from 5,000 cps to 40,000 cps, from 5,000 cps to 25,000 cps, from 5,000 cps to 15,000 cps, from 10,000 cps to 25,000 cps, from 10,000 cps to 40,000 cps, or from 25,000 cps to 40,000 cps.

For another example, under a pressure ranging from 50 bar to 220 bar and at a temperature ranging from −20° C. to 100° C., the sealant fluid may comprise a volume elasticity of from 0.1 MPa to 10 MPa, such as from 0.1 MPa to 5 MPa, from 0.1 MPa to 1 MPa, from 1 MPa to 10 MPa, from 1 MPa to 5 MPa, from 5 MPa to 10 MPa, from 5 MPa to 7.5 MPa, or from 7.5 MPa to 10 MPa.

In one or more embodiments, the sealant fluids may comprise a viscosity of from 100 cps to 25,000 cps and a volume elasticity range of from 0.1 MPa to 10 MPa under a pressure ranging from 100 bar to 220 bar and at a temperature ranging from 10° C. to 80° C.

For example, under a pressure ranging from 100 bar to 220 bar and at a temperature ranging from 10° C. to 80° C., the sealant fluid may comprise a viscosity of from 100 cps to 25,000 cps, from 500 cps, to 20,000 cps, from 500 cps to 10,000 cps, from 500 cps, to 5,000 cps, from 1,500 cps to 25,000 cps, from 1,500 cps to 25,000 cps, from 1,500 cps to 7,500 cps, from 5,000 cps to 25,000 cps, from 5,000 cps to 15,000 cps, or from 10,000 cps to 25,000 cps.

For another example, under a pressure ranging from 100 bar to 220 bar and at a temperature ranging from 10° C. to 80° C., the sealant fluid may comprise a volume elasticity of from 0.1 MPa to 10 MPa, such as from 0.1 MPa to 5 MPa, from 0.1 MPa to 1 MPa, from 1 MPa to 10 MPa, from 1 MPa to 5 MPa, from 5 MPa to 10 MPa, from 5 MPa to 7.5 MPa, or from 7.5 MPa to 10 MPa.

Several categories of sealant fluid meet the criteria. According to embodiments, the sealant fluid may be selected from silicones, polyurethanes, epoxy resins, or combinations thereof.

In one or more embodiments, the sealant fluid may be selected from silicones, polyurethanes, or combinations thereof.

In one or more embodiments, the sealant fluid may be a silicone.

The sealant fluid may further comprises additives to adjust its viscoelastic property or to prevent weathering-induced degradation. According to embodiments, the sealant fluid may further comprise at least one additive that inhibits the sealant fluid from hardening or adjusts the viscosity and elasticity of the sealant fluid, wherein the at least one additive may comprise one or more of hindered amine light stabilizers, benzotriazoles, and combinations thereof.

In one or more embodiments, the sealant fluid may comprise from 0.5 wt. % to 20 wt. % additives, such as from 1 wt. % to 20 wt. %, from 1 wt. % to 12 wt. %, from 1 wt. % to 8 wt. %, from 4 wt. % to 20 wt. %, from 4 wt. % to 15 wt. %, from 4 wt. % to 12 wt. %, from 9 wt. % to 20 wt. %, from 9 wt. % to 14 wt. %, from 13 wt. % to 20 wt. %, or from 16 wt. % to 20 wt. %.

What is claimed is:

1. A method of temporarily sealing a leak between flanges of a pipeline wherein the flanges are spaced apart by a flange gap and interconnected by a plurality of bolts, comprising:
- providing a system for temporarily sealing leaks between flanges of a pipeline comprising a flexible tube, a sealant fluid, a fluid pump, and a gas-release assembly, wherein;
  - the flexible tube comprises a tube material impermeable to the sealant fluid such that an outer surface of the flexible tube is essentially free of the sealant fluid; and
  - the sealant fluid comprises a viscosity of from 100 cps to 50,000 cps and a volume elasticity of from 0.1 MPa to 10 MPa under a pressure of from 1 bar to 220 bar and at a temperature of from −40° C. to 150° C.
- disposing the flexible tube between the flanges such that the flexible tube substantially fills the flange gap between the flanges;
- introducing the sealant fluid into the flexible tube using the fluid pump; and
- pressurizing the sealant fluid using the fluid pump to an operating pressure of from greater than or equal to 5 bar to less than or equal to 220 bar and concurrently removing a gas trapped inside the sealant fluid and the flexible tube using the gas-release assembly, wherein the pressurized sealant fluid expands the flexible tube to fill the flange gap between the flanges, and thereby stops or reduces the leak between the flanges.

2. The method of claim 1, further comprising:
- removing the sealant fluid from the flexible tube; and
- deflating the flexible tube;
- wherein the flexible tube and the sealant fluid is reusable for additional leaks between flanges of a pipeline.

3. The method of claim 1, wherein the tube material is selected from one or more of nitrile rubber, ethylene propylene diene monomer rubber, neoprene rubber, and combinations thereof.

4. The method of claim 1, wherein the sealant fluid comprises a viscosity of from 100 cps to 40,000 cps and a volume elasticity of from 0.1 MPa to 10 MPa under a pressure ranging from 50 bar to 220 bar and a temperature ranging from −20° C. to 100° C.

5. The method of claim 1, wherein the sealant fluid is selected from silicones, polyurethanes, epoxy resins, or combinations thereof.

6. The method of claim 1, wherein the sealant fluid is selected from silicones, polyurethanes, or combinations thereof.

7. The method of claim 1, wherein the sealant fluid is a silicone.

8. The method of claim 1, wherein the sealant fluid further comprises at least one additive, wherein:
- the at least one additive inhibits the sealant fluid from hardening or adjusts the viscosity and elasticity of the sealant fluid; and
- the at least one additive comprises one or more of hindered amine light stabilizers, benzotriazoles, and combinations thereof.

9. The method of claim 1, wherein the fluid pump comprises a first check valve, and the first check valve passes a sealant fluid into the flexible tube and hinders the sealant fluid in the flexible tube from flowing back to the fluid pump.

10. The method of claim 1, wherein the gas-release assembly comprises a second check valve, wherein:
- the second check valve is configured to pass a gas, a sealant fluid, or combinations thereof inside the flexible tube through the second check valve and leave the system; and
- the second check valve is configured to prevent a gas, a sealant fluid, or combinations thereof outside the system from passing through the second check valve and entering the flexible tube.

11. The method of claim 10, wherein the second check valve is configured to pass only the gas inside the flexible tube through the second check valve and leave the system.

12. The method of claim 11, wherein the second check valve is configured to begin passing the sealant fluid inside the flexible tube through the second check valve and leave the system after the sealant fluid is pressurized to a pressure greater than 1 bar.

13. The method of claim 11, wherein the second check valve is configured to begin passing the sealant fluid inside the flexible tube through the second check valve and leave the system after the sealant fluid is pressurized to a pressure greater than 5 bar.

14. The method of claim 1, wherein the pressurized sealant fluid expands the flexible tube, wherein the flexible tube comprises a starting diameter or width of from 2 mm to 4 mm before introducing the sealant fluid into the flexible tube and an expanded diameter or width of from 2 mm to 8 mm after the sealant fluid has been introduced into the flexible tube and pressurized.

15. The method of claim 1, wherein disposing the flexible tube between the flanges comprises encircling the flange joint and filling the flange gap with a plurality of staggered layers of the flexible tube.

16. A method of temporarily sealing a leak between flanges of a pipeline wherein the flanges are spaced apart by a flange gap and interconnected by a plurality of bolts, comprising:

providing a system for temporarily sealing leaks between flanges of a pipeline comprising a flexible tube, a sealant fluid, a fluid pump, and a gas-release assembly, wherein;

the flexible tube comprises a tube material impermeable to the sealant fluid such that an outer surface of the flexible tube is essentially free of the sealant fluid;

the tube material is selected from one or more of nitrile rubber, ethylene propylene diene monomer rubber, neoprene rubber, and combinations thereof;

the sealant fluid comprises a viscosity of from 100 cps to 50,000 cps and a volume elasticity of from 0.1 MPa to 10 MPa under a pressure of from 1 bar to 220 bar and at a temperature of from −40° C. to 150° C.; and the sealant fluid is selected from silicones, polyurethanes, or combinations thereof;

disposing the flexible tube between the flanges such that the flexible tube substantially fills the flange gap between the flanges, wherein disposing the flexible tube between the flanges comprises encircling the flange joint and filling the flange gap with a plurality of staggered layers of the flexible tube;

introducing the sealant fluid into the flexible tube using the fluid pump; and pressurizing the sealant fluid using the fluid pump to an operating pressure of from greater than or equal to 5 bar to less than or equal to 220 bar and concurrently removing a gas trapped inside the sealant fluid and the flexible tube using the gas-release assembly, wherein the pressurized sealant fluid expands the flexible tube to fill the flange gap between the flanges, and thereby stops or reduces the leak between the flanges.

* * * * *